March 20, 1956 J. J. McGILLIS ET AL 2,738,802
LIQUID LEVEL MAINTENANCE APPARATUS
Filed April 13, 1953 2 Sheets-Sheet 1
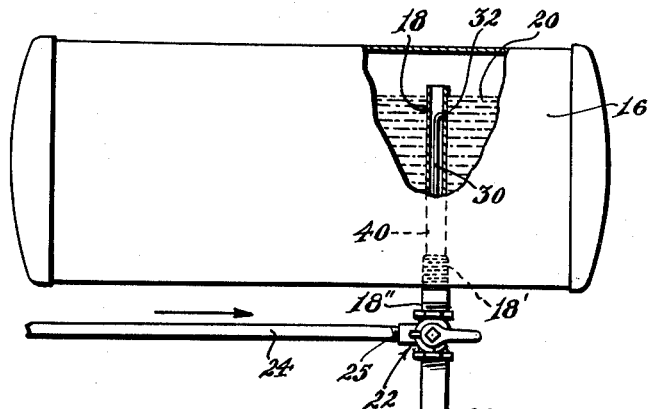
Fig. 1.
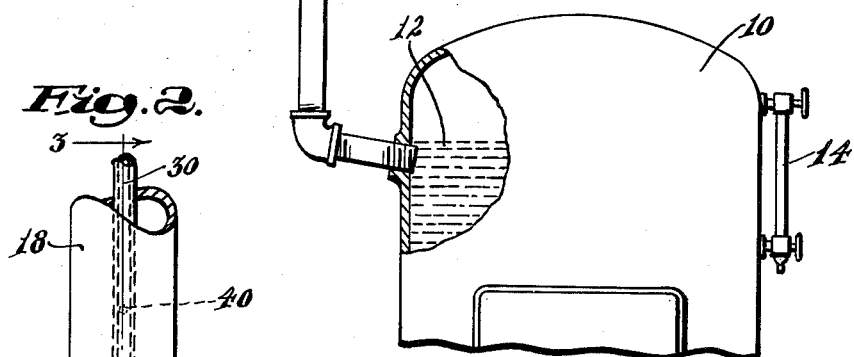
Fig. 2.
Fig. 5.
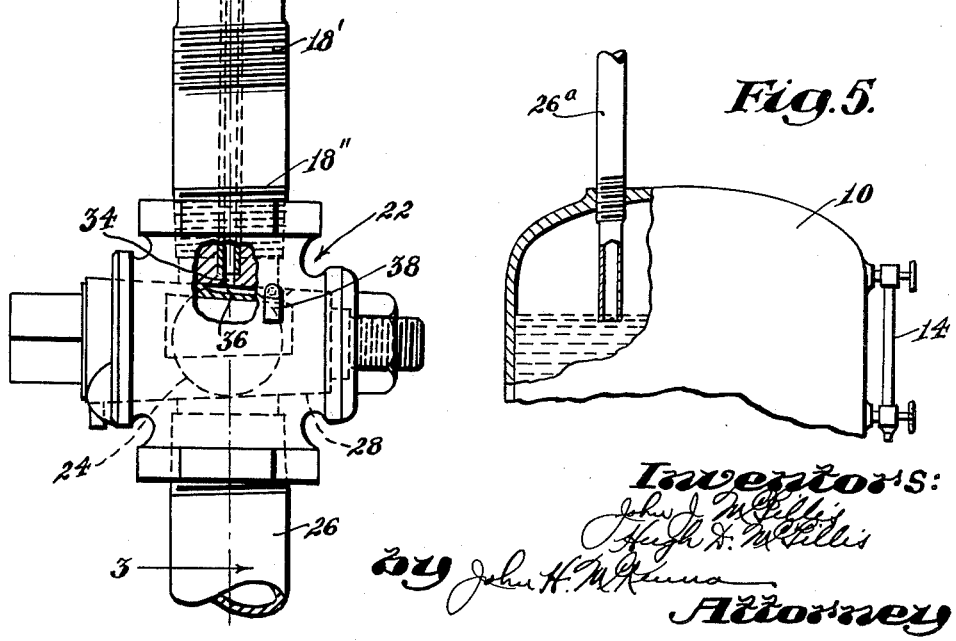
Inventors:
John J. McGillis
Hugh J. McGillis
by John H. McKenna
Attorney

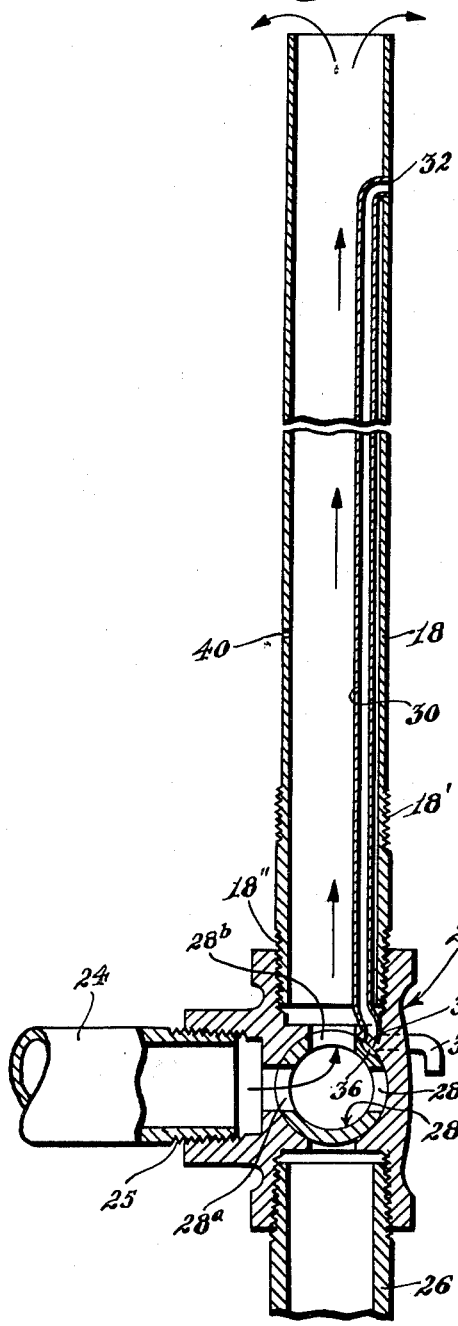
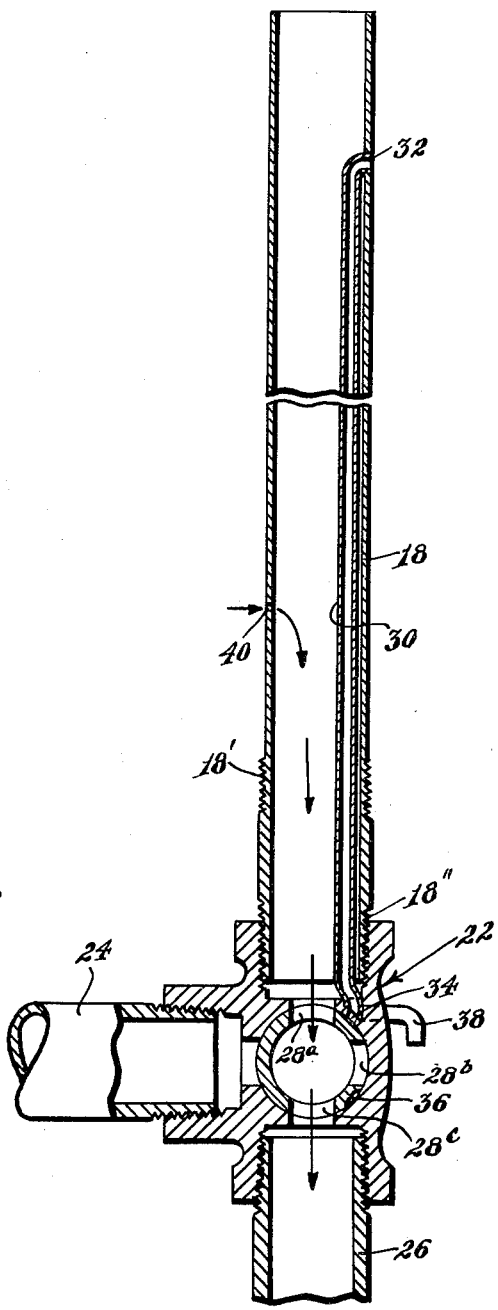

United States Patent Office 2,738,802
Patented Mar. 20, 1956

2,738,802

LIQUID LEVEL MAINTENANCE APPARATUS

John J. McGillis and Hugh D. McGillis, Brockton, Mass.

Application April 13, 1953, Serial No. 348,212

5 Claims. (Cl. 137—454)

This invention relates to improvements in liquid level maintenance apparatus. More especially it provides apparatus which responds to a relatively minute lowering of liquid level in a receptacle and quickly restores the original level from an available supply of the liquid. The invention may have general application wherever maintenance of substantially a constant level of liquid in a receptacle is desired or necessary, and has been found to have particular utility for maintaining a predetermined water level in boilers, and the like.

It is among the objects of our present invention to provide a simple and efficient liquid level maintenance apparatus which functions without any moving parts to maintain a predetermined substantially constant level of liquid in a receptacle. A partial vacuum condition is created and maintained in a closed supply tank which holds the liquid against flow from the tank so long as liquid in a receptacle continues to be at a level to seal one end of a conduit extending between the said supply tank and the said receptacle. A relatively slight drop of the level of liquid in the said receptacle breaks the seal at the end of said conduit thereby relieving the partial vacuum in the supply tank and permitting flow of liquid from the tank through said conduit for restoring the level of liquid in the receptacle.

Another object of our invention is to provide a simple and efficient liquid level maintenance apparatus wherein a mere trickle of liquid is released from a supply tank for gravity flow to a receptacle only when a partial vacuum condition above a supply body of liquid in the supply tank becomes relieved in response to a relatively small drop of the level of liquid in the said receptacle, the said gravity flow of a trickle of liquid and the relieving of said partial vacuum condition occurring within a common conduit extending between the supply tank and the receptacle.

A further object of the invention is to provide a liquid level maintenance apparatus wherein a partial vacuum condition within a supply tank is relied upon to release liquid from the tank for gravity flow to a receptacle within which a body of liquid is to be maintained at a predetermined substantially constant level, the said flow being a trickling flow through an open conduit which serves also for passage of air between said receptacle and tank when the level of liquid in said receptacle drops appreciably below said predetermined level, there being means for manual closing of said conduit when replenishing the supply of liquid in the tank, and warning means for indicating when said supply of liquid in the tank has been replenished to a predetermined level.

It is, moreover, our purpose and object generally to improve the structure, effectiveness and efficiency of liquid level maintenance apparatus and devices by eliminating the need for mechanism having moving parts.

In the accompanying drawings:

Fig. 1 is a side elevation of liquid level maintenance apparatus embodying features of our invention, wall portions thereof being broken away;

Fig. 2 is an elevational view of the juncture portions of the flow conduits of the apparatus of Fig. 1, on a larger scale, and showing the manually operable two position valve which may be positioned for normal operation of the apparatus or for replenishing the supply of liquid in the supply tank;

Fig. 3 is a cross-sectional view of the juncture portions of the flow conduits and valve of Fig. 2, on line 3—3 of Fig. 2, but showing more of the pipe which extends into the supply tank, the valve being in its position for replenishing the supply of liquid in the tank;

Fig. 4 is a view similar to Fig. 3 but showing the valve in its position for normal operation of the apparatus; and Fig. 5 is a view of the upper portion of a boiler showing the conduit from the supply reservoir or tank entering the boiler water chamber through its top and extending down to slightly below the predetermined level of water in the boiler.

Referring to the drawings, the upper portion of a conventional boiler is represented at 10 in Fig. 1, and a body of water 12 is to be maintained therein substantially at the illustrated level, with a conventional water gauge 14 for indicating the level of the water. When the level of the water 12 in the boiler drops appreciably, it quickly is restored to the predetermined level from a supply reservoir or tank 16 located at any convenient place well above the water level which is to be maintained in boiler 10.

According to the invention, the supply reservoir or tank 16 has a conduit or pipe 18 extending through its bottom wall and rising substantially vertically therein to a location a little above the maximum level of water 20 in the tank. Pipe 18 may be exteriorly threaded at 18' for screwing into the bottom wall of the tank in a manner to effect a water-tight seal around the pipe, whose upper end is open into the interior of the tank above the water therein, and whose lower end may be threaded at 18" for connection thereto of a valve fitting indicated generally at 22. Valve fitting 22 is connected to conduit 24 which leads from any suitable pressure source of water, and is connected to a conduit 26 which leads therefrom to boiler 10 and is open at its lower end into the interior of the water chamber slightly below the predetermined level of water in the chamber.

A two position tapering hollow valve 28 is rotatably mounted in valve fitting 22 and has three slots 28ª, 28ᵇ, 28ᶜ in its walls spaced 45° apart around the axis of the valve. In one position of valve 28, valve slots 28ª, 28ᵇ provide a flow passage through the valve for flow of water under pressure from conduit 24 into vertical pipe 18, as represented in Fig. 3, the entrance to conduit 26 being closed. In the other position of valve 28, flow from conduit 24 is cut off and valve slots 28ª, 28ᶜ connect vertical pipe 18 through the valve with conduit 26. Hence, with the valve in its Fig. 3 position, the supply of water 20 in tank 16 may be replenished while flow to the boiler is cut off.

It is a feature of the invention that a warning is given when the level of water in tank 16 has been restored. A relatively small tube 30 extends within vertical pipe 18 and has its upper end permanently secured to and open through a wall portion of pipe 18 at a location 32 which is at or slightly below the predetermined maximum water level in tank 16. The lower end portion of tube 30 extends into valve fitting 22 and is permanently secured to and open through a valve seat portion of the fitting at 34. An outer surface portion of valve 28 is grooved at 36 between the flow slots 28ᵇ, 28ᶜ, and this groove 36 connects the lower end of tube 30 with the outlet 38 when the valve is in its position of Fig. 3, and the lower end of tube 30 is closed when the valve is in its position of Fig. 4.

During the process of replenishing the supply of water in tank 16, the water level in the tank will rise gradually until it reaches the opening at 32 into the upper end of tube 30, at which time a relatively small stream of water will flow downward through tube 30 and through valve groove 36 and discharge through outlet 38 for indicating that the predetermined level of water in tank 16 has been reached. Valve 28 then will be turned to its position of Fig. 4 wherein it closes pressure supply conduit 24 and the lower end of tube 30 and opens a flow passage through the valve between pipe 18 and conduit 26.

A small hole 40 through the wall of pipe 18 may be of the order of a mere pin hole and is located relatively close to the bottom of tank 16. Pin hole 40 constitutes the only passage for flow of water from tank 16 into pipe 18 and thence to boiler 10. It will be obvious, therefore, that only a relatively small trickle of water can flow from supply tank 16 to the boiler, and this relatively small trickling flow occurs only intermittently because a partial vacuum above the water in tank 16 prevents flow from the tank excepting when a liquid level drop in the boiler relieves the partial vacuum condition in tank 16. Hence, there always is substantial air space within the entire length of pipe 16.

Assuming a condition of the boiler and tank as represented in Fig. 1, with valve 28 in its position of Fig. 4, water in the boiler seals the lower end of conduit 26 and the effect of gravity on the liquid in tank 16, tending to produce flow through small hole 40, creates a partial vacuum above the liquid in tank 16 which holds the liquid against flow until the partial vacuum is relieved. Hence, there will be no appreciable flow from tank 16 so long as the water level in boiler 10 is above the lower end of conduit 26. But, the moment that the boiler water level drops enough to let air from above the water in the boiler enter the lower end of conduit 26, the partial vacuum in tank 16 will be relieved and a trickling flow from the tank through small hole 40 and through conduit 26 will occur until the boiler water level is restored to a level to again seal the lower end of conduit 26. It may be assumed that the air above the water in boiler 10 is maintained at atmospheric pressure or approximately atmospheric pressure.

Fig. 5 shows a modification in which conduit 26ª, leading from valve fitting 22, extends through the top of boiler 10 with its lower end slightly below the water level which is to be maintained approximately constant in boiler 10, in which the action is similar to that in the Fig. 1 embodiment.

It will be apparent that our herein disclosed liquid level maintenance apparatus, functions without any moving parts and maintains liquid in a receptacle more nearly at a continuously uniform level as compared with conventional float control devices which respond only to substantial drops of the level of liquid. However, any conventional liquid level control device, float-controlled or otherwise, may be employed in supply tank 16, in conjunction with any suitable signalling mechanism, for calling attention to the need for replenishing the supply of water in tank 16, whose water level may be permitted to drop to near the level of pin hole 40 in pipe 18 without materially affecting operation of the system. Actually, the tank 16 may be of size to hold an adequate amount of water for supplying the boiler throughout an entire heating season without replenishing the supply.

It has been found that the pin hole 40 tends to be self-cleaning with no apparent tendency to become clogged. This is due in part to the thinness of the wall through which it extends and in part to the fact that there is no turbulence within tank 16 excepting at the infrequent times when the water supply is being replenished. During ordinary periods of operation of the system, sediment and foreign matter remains undisturbed in a settled condition at the bottom of the tank.

Usually required boiler water level safety alarms are not necessary with the herein disclosed system, but may be present on a boiler as a further safeguard whenever desired.

In Fig. 1, the water level in tank 16 is shown appreciably above the upper end of tube 30 which is a condition which would occur only if the valve 28 were left in its Fig. 3 position for a substantial time after initiation of the small signalling stream of water from outlet 38. Usually the valve will be shifted to its Fig. 4 position as soon as water starts to flow from outlet 38, or shortly thereafter, and the level of water 20 in the tank ordinarily would not be elevated but little above the upper end of tube 30.

We claim as our invention:

1. Apparatus for maintaining liquid in a receptacle at a substantially constant level, comprising a said receptacle having liquid therein up to a predetermined level and having an air space above the liquid therein wherein air is maintained substantially at atmospheric pressure, a closed and sealed supply tank located substantially above said predetermined level of liquid in said receptacle and having a supply of liquid therein and a substantial air space above the liquid therein, a single conduit having substantial diameter extending between said closed tank and said receptacle and constantly open at one portion thereof into said air space above the liquid in said closed tank, another portion of said conduit having extent through the liquid in said closed tank and having a relatively small flow passage in its side wall open into the said closed tank substantially below the level of liquid in the closed tank, and another portion of said conduit being open into said receptacle only slightly below the said predetermined level of liquid in the receptacle with the liquid sealing this latter portion of the conduit, whereby the force of gravity acting to cause flow of liquid from the tank through said relatively small flow passage in the conduit means creates a partial vacuum above the liquid in said closed tank which holds the liquid against flow from the closed tank until said partial vacuum is relieved in response to a drop of the level of liquid in said receptacle to a degree which opens the said portion of the conduit means in said receptacle to the air pressure above the liquid in said receptacle, said conduit serving simultaneously for flow of air between said air spaces above the liquid in said receptacle and tank and for trickling flow of liquid from said tank to said receptacle.

2. Apparatus for maintaining liquid in a receptacle at a substantially constant level, comprising a said receptacle having liquid therein up to a predetermined level and having an air space above the liquid therein wherein air is maintained substantially at atmospheric pressure, a closed and substantially sealed supply tank located substantially above said predetermined level of liquid in said receptacle and having a supply of liquid therein and a substantial air space above the liquid therein, a single conduit having substantial diameter extending between said tank and said receptacle and having one portion thereof constantly open into said air space above the liquid in said tank, and having another portion extending through the liquid in said tank with a relatively small hole through a side wall of the latter said conduit portion for relatively small trickling outflow of liquid from the tank into said single conduit, said single conduit having still another portion open into said receptacle slightly below the said predetermined level of liquid in the receptacle with the liquid sealing this latter portion of the single conduit and maintaining any partial vacuum in said air space above the liquid in said tank that may be holding the liquid in said tank against flow into said single conduit through said relatively small hole, a said partial vacuum in the tank being relieved by flow of air through said single conduit to release liquid for flow through said relatively small hole and for trickling flow of liquid in said single conduit simultaneously with said flow of air therein in response to a drop of the level of liquid in said receptacle to a degree which breaks the seal at said portion of the single conduit which is open into said receptacle.

3. Apparatus for maintaining liquid in a receptacle at a substantially constant level, as described in claim 2, wherein a valve is mounted in said single conduit between said tank and said receptacle, and a conduit leading from a source of pressure liquid is connected to said single conduit in position to be controlled by said valve, said valve being manually operable between a position in which it closes flow through said single conduit to said receptacle and opens flow between said second conduit and said tank, for replenishing the supply of liquid in the tank, and a position in which it closes said second conduit and opens said single conduit for flow between said tank and said receptacle.

4. Apparatus for maintaining liquid in a receptacle at a substantially constant level, comprising a closed storage tank holding a supply of liquid with a substantial body of air above the liquid in the tank, a pipe having substantial diameter connected to and extending through a lower wall portion of said tank and having substantial extent through the liquid with an upper end portion thereof constantly open to said air above the liquid in the tank, a valve fitting connected to the lower end of said pipe exteriorly of the tank, a conduit leading from a source of liquid under pressure and connected to said valve fitting, a receptacle located substantially below said tank and having liquid therein whose level is to be maintained substantially constant, a second conduit extending between said valve fitting and said receptacle with its lower end open into the receptacle at a location slightly below the said level at which the liquid is to be maintained substantially constant whereby liquid at said level seals this end of the conduit, said pipe having a relatively small hole in its side wall at a location within said tank well down below the level of said body of liquid in the tank and constituting the only flow passage for liquid from said tank into said pipe, said sealed lower end of said conduit which is open into said receptacle in conjunction with the gravity effect tending to cause flow of liquid from the tank through said relatively small hole in said pipe creating a partial vacuum above the liquid in said tank preventing liquid flow until the partial vacuum becomes relieved in response to a drop of the liquid level in said receptacle enough to break the seal at said lower end of said conduit within said receptacle, and a valve in said valve fitting operable to selectively connect said tank to said pressure liquid conduit and to said receptacle, said pipe serving for passage of air therethrough for relieving said partial vacuum simultaneously with trickling flow of liquid therein from said tank.

5. Apparatus as described in claim 4 having means associated with said pipe and valve fitting for indicating when the level of liquid in said tank has reached a predetermined level as a result of connecting said tank to said pressure liquid conduit, said means comprising a tube extending within said pipe and having its upper end open through a wall of the pipe at said predetermined level within the tank and having its lower end connected through said valve fitting to a discharge outlet, whereby a relatively small stream of liquid issues from said outlet when the level of liquid in said tank is at a level for passage of liquid into said upper end of said tube.

References Cited in the file of this patent

UNITED STATES PATENTS

| 1,215,152 | Hoffa | Feb. 6, 1917 |
| 1,972,962 | Weber | Sept. 11, 1934 |
| 2,637,336 | Emery | May 5, 1953 |